Jan. 29, 1946.　　　F. P. LAWLER　　　2,393,916
CRANE ATTACHMENT FOR TRACTORS
Filed Sept. 30, 1944　　　2 Sheets-Sheet 1

INVENTOR.
FRANK P. LAWLER
BY
Castberg & Roemer
ATTORNEYS

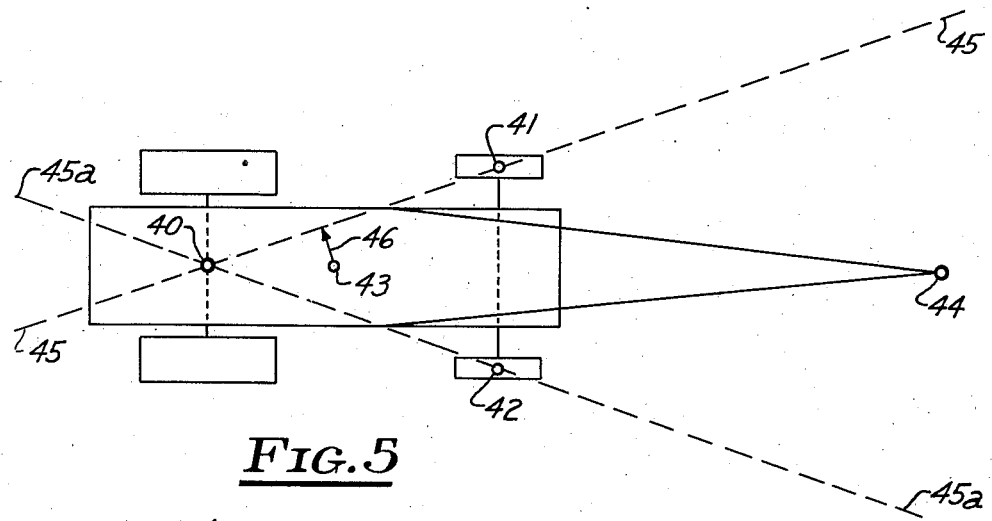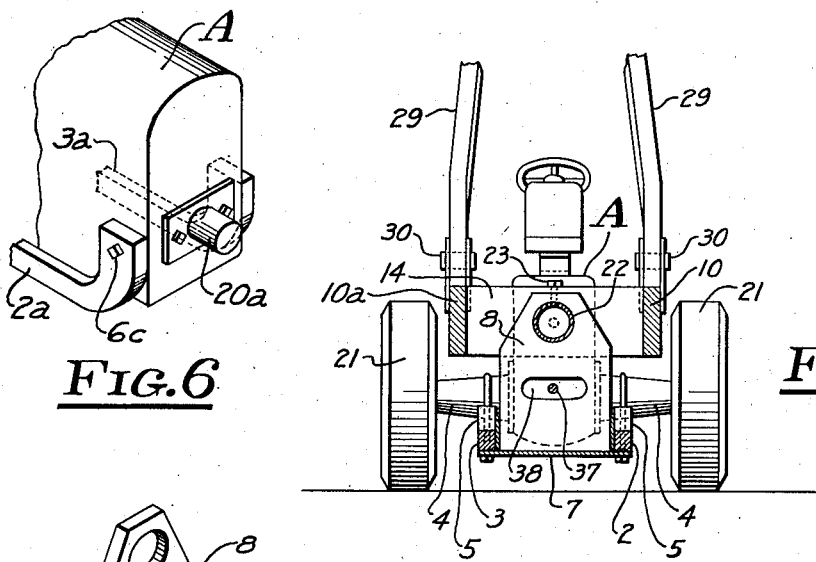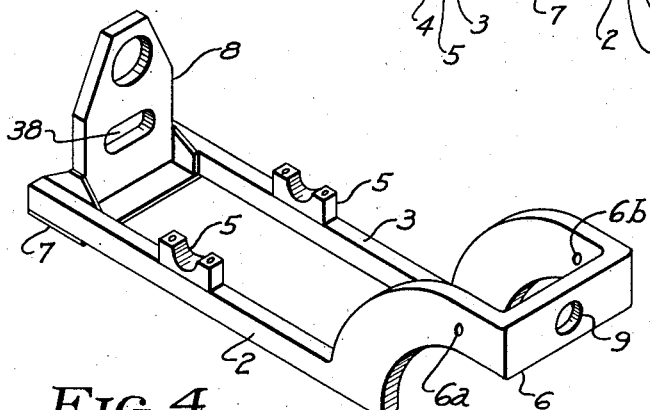

Patented Jan. 29, 1946

2,393,916

UNITED STATES PATENT OFFICE 2,393,916

CRANE ATTACHMENT FOR TRACTORS

Frank P. Lawler, Chicago, Ill., assignor to Service Supply Corporation, Philadelphia, Pa., a corporation of Pennsylvania Application September 30, 1944, Serial No. 556,629

8 Claims. (Cl. 212—8)

This invention relates to a modification or improvement on the crane attachment for tractors disclosed in my recently issued Patent No. 2,363,341, dated November 21, 1944.

The object of the invention is generally to improve and simplify the construction and operation of structures of this character; to provide a crane construction of the general type disclosed in the co-pending application above referred to, but differing therefrom in that the tractor is provided with a sub-frame consisting of structural members which are rigidly attached to the tractor and designed to provide front and rear pivot points for oscillation in a crane frame and arranged so as to relieve the tractor itself from all destructive, torsional or bending strains incident to crane operation; and further, to provide a sub-frame which is so arranged that the power take-off shaft of the tractor can be carried through the sub-frame on the axis of oscillation or above or below this axis as required by various standard tractor units which may be employed for crane operation.

The crane attachment for tractors is shown by way of illustration in the accompanying drawings in which:

Fig. 3 is a cross section on line 3—3 of Fig. 2;

Fig. 4 is a perspective view of the sub-frame;

Fig. 5 is a diagrammatic view of the crane attachment and tractor unit; and

Fig. 6 is a perspective view of the front end of the tractor showing a modified mounting of the pivot pin 20.

Figure 1:
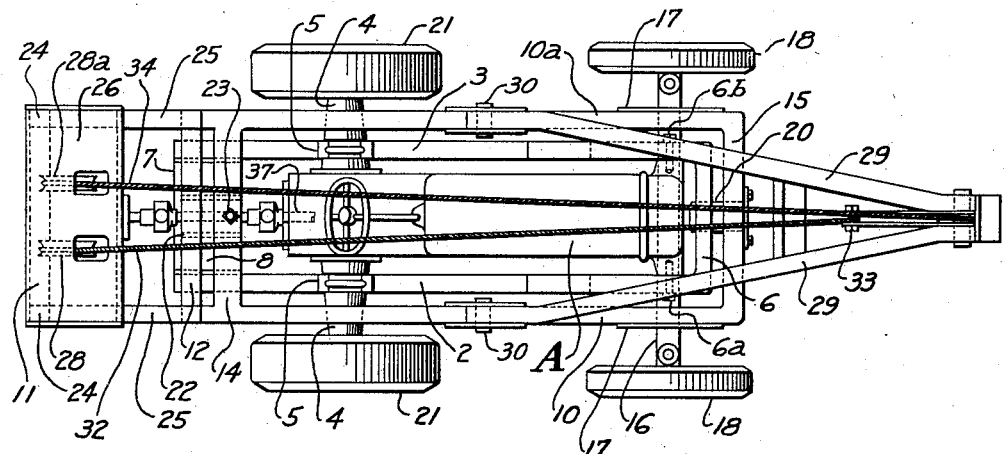
Fig. 1 is a plan view of the crane attachment complete except with the operating seat shown removed for clarity.

Referring to the drawings in detail and especially Figs. 1, 2 and 3, A indicates in general a conventional four-wheel tractor in which the motor or engine, the transmission housing, the final drive housing, together with the rear axle housings, are all mounted to form a rigid unit structure which will hereinafter be referred to as the main frame.

Rigidly secured to the main frame is a sub-frame which is composed of a pair of longitudinally extending structural beams 2 and 3. These beams are disposed one on each side of the tractor and below the axle housings 4. Adjacent to the rear ends of the beams are saddles 5 whereby the beams are rigidly secured to the axle housings. The forward ends of the beams are rigidly connected by a yoke 6 and this is in turn rigidly secured to the forward end of the main frame or tractor unit A by some means such as bolts 6a and 6b. The extreme rear ends of the sub-frame beams 2 and 3 are connected by a cross-plate 7 and an upright bearing plate 8, these plates being reinforced by gussets and being welded to each other and the beams. A journal 9 is formed in the yoke 6 (see Fig. 4) and this forms a pivotal support for the forward end of the tractor unit and the sub-frame secured thereto, while the bearing plate 8 forms a pivotal support for the rear end of a crane supporting frame now to be described.

The crane supporting frame is disposed above the sub-frame and the axle housings of the main frame or tractor unit. It consists of two longitudinally extending side beams 10 and 10a which are connected by cross-beams 11, 12, 14 and 15, of which beams 11 and 15 form the rear and front ends respectively of the crane frame. A front axle 16 is rigidly secured to and supports the front end of the crane frame by means of gusset plates 17 welded or otherwise secured to opposite sides of the crane frame, and the axle in turn is supported by front wheels 18 pivoted in forks in the usual manner to provide steering.

A bearing pin 20 secured to the front cross-beam 15 of the crane frame extends into the journal 9 formed in the yoke 6 and as such forms a pivot and a support for the front end of the tractor unit and the sub-frame which is rigidly secured thereto. The rear end of the tractor unit and sub-frame is supported by rear driving wheels 21 while the rear end of the crane frame is pivoted on and supported by a tubular sleeve 22 which extends through the cross-beams 12 and 14, and the bearing plate 8. The sleeve 22 is secured against removal by welding or any other means such as set screw 23. Thus the front end of the crane frame is supported directly by the front steering wheels and at the rear it is supported by the sleeve 22 and is free to pivot thereon. Conversely, the rear end of the tractor unit and sub-frame is supported by the driving wheels of the tractor while the front end is supported by and pivots on the pin 20. A three-point support is accordingly provided for the tractor unit and sub-frame and a three-point support is similarly provided for the crane frame. The importance of these three-point supports will hereinafter appear.

The crane frame as the name implies forms a support for a power operated crane. This frame consists of a pair of A frames disposed at the rear end of the crane frame. These A frames consist of vertical members 24 and angularly disposed beams or structural members 25, and they are connected at the upper ends by a crosswise extending arcuate-shaped member 26. Also extending crosswise of the A frames and secured therein is a shaft 27, and journaled thereon are a pair of sheaves 28 and 28a. A boom is also supported by the crane frame. This boom consists of two arms 29—29 which at their lower ends are pivoted to the crane frame as at 30—30. The upper ends of the boom arms converge, and a boom point sheave 31 is journaled in the usual way at the peak or upper end of the boom.

A two-drum hoist B is suitably mounted at the extreme rear end of the crane frame, and in actual practice, a cable 32 from one drum leads over sheave 28 and is dead-ended at the peak of the boom as at 33. A second cable 34 carried by the other drum leads over the sheaves 28a and 31 to a sheave hook block 35, and is then dead-ended near the point of the boom as at 36.

The two-drum hoist may be driven in any suitable manner, or as here shown through a power take-off shaft 37 on the tractor, and when one drum is driven, a load attached to the hook block sheave may be raised or lowered while operation of the second drum will raise or lower the boom.

The power take-off shaft extends through a slot 38 formed in the bearing plate 8 at a point below the sleeve 22 as shown in full lines in Fig. 2 and power is transmitted from the power take off shaft to the hoist through a chain drive 37a or the like.

The sleeve 22 serves as a pivotal support for the rear end of the crane frame. The sleeve 22 and the pin 20 are in direct alignment with each other so as to permit free oscillation between the tractor unit (complete with its sub-frame) and the crane frame, or vice versa, and as the power take-off extends through the slot 38, universal joints such as shown on the power take-off shaft 37 may be employed. That is, strains might be encountered during certain load conditions which might cause sufficient bending to set up detrimental deflections; hence, the use of universal couplings is preferable.

Fig. 5 illustrates diagrammatically the three-point support obtained by the two front wheels and the rear pivot, or sleeve 22. These three-points of support are indicated at 40, 41 and 42. The center of gravity of the crane unit is indicated at 43, and the load to be raised at 44. The axis of sidewise overturning of the tractor and crane frame is indicated by the lines 45—45, 45a—45a, and the weight lever arm by the arrow 46. It should be noted that the two points of support indicated at 41 and 42, or in other words the front wheels, are located between the center of gravity 43 and the load 44. This is very important as it provides maximum stability against sidewise overturning when the crane is picking up, supporting or transporting a load. Stability is further insured due to the fact that the center of gravity 43 and the load 44 will, during all normal operating conditions, remain in a position inside or centrally of the lines or axes of overturning indicated at 45—45, 45a—45a. In other words, sidewise overturning cannot take place until the center of gravity of the load is shifted to the outside of these axes of overturning.

From the foregoing, it should be apparent that a simple rigid frame and boom structure is provided, and that by providing the sub-frame and securing it to the tractor unit in the manner disclosed and described, the major forces produced when lifting or transporting a load will be transmitted directly through the crane frame to the front wheels and indirectly to the tractor rear wheels through the sub-frame, thus relieving the tractor unit itself from any strains or stresses that might detrimentally affect it, and long life and dependable operation is accordingly assured.

Maximum head-on stability is provided inherently by the construction of the unit, and as sidewise stability is insured by the two forward supporting or steering wheels indicated at 41 and 42 in Fig. 5, the driver or operator can work in comparative safety.

Figure 2:
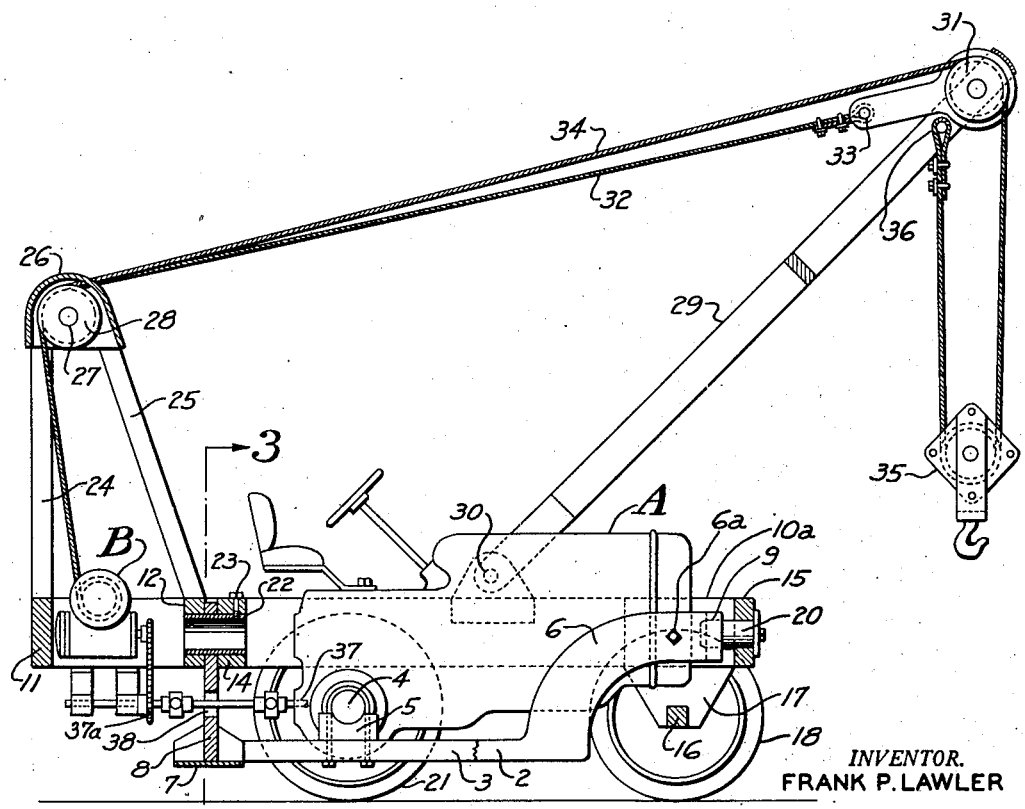
Fig. 2 is a side elevation of the crane attachment and tractor partially in section.

In Figs. 1, 2 and 4 the front ends of the side members 2 and 3 are shown as connected by the front cross member 6, and this member is provided with a journal 9. This specific construction is not essential to the successful operation of the tractor or crane as a whole. For instance, in the modification shown in Fig. 6, it will be noted that the front ends of the side members 2a and 3a of the sub-frame are secured directly to the front end of the main frame by bolts 6c and that the cross member 6 is entirely eliminated. In such a structure the pin indicated at 20a may be bolted or welded directly to the front end of the main frame and will extend into a journal formed in the front cross member of the crane frame. While this and other features of my invention have been more or less specifically described and illustrated, I wish it understood that various changes in form and construction may be resorted to within the scope of the appended claims, and that the materials and finish of the parts employed may be such as the experience and judgment of the manufacturer may dictate, or varying uses may demand.

Having thus described my invention, what I claim and desire to secure by Letters Patent is:

1. In a structure of the character described, a tractor unit and a crane supporting frame, a sub-frame rigidly secured to the tractor unit, a pair of rear driving wheels on the tractor unit forming a rigid two-point support for the rear end of the sub-frame and tractor unit, a pair of front wheels forming a rigid two-point support for the crane frame, a pivotal support between the front end of the tractor unit and the crane frame and a pivotal support between the rear end of the sub-frame and the crane frame.

2. In a structure of the character described, a tractor unit and a crane supporting frame, a sub-frame rigidly secured to the tractor unit, a pair of rear driving wheels on the tractor unit forming a rigid two-point support for the rear end of the sub-frame and tractor unit, a pair of front wheels forming a rigid two-point support for the crane frame, a pivotal support between the front end of the tractor unit and the crane frame and a pivotal support between the rear end of the sub-frame and the crane frame, said first and last named pivotal supports being disposed on a common plane and axis.

3. In a structure of the character described, a tractor unit and a crane supporting frame, a sub-frame rigidly secured to the tractor unit, a pair of rear driving wheels on the tractor unit forming a rigid two-point support for the rear end of the sub-frame and tractor unit, a pair of front wheels forming a rigid two-point support for the crane frame, a pin on the front end of the crane frame forming a pivot and support for the front end of the sub-frame and the tractor unit to which the sub-frame is secured, a bearing carried by the rear end of the sub-frame, and a pin on the crane frame extending into said bearing and forming a pivot and support for the rear end of the crane frame.

4. In a structure of the character described, a tractor unit and a crane supporting frame, a sub-frame rigidly secured to the tractor unit, a pair of rear driving wheels on the tractor unit forming a rigid two-point support for the rear end of the sub-frame and tractor unit, a pair of front wheels forming a rigid two-point support for the crane frame, a pin on the front end of the crane frame forming a pivot and support for the front end of the sub-frame and the tractor unit to which the sub-frame is secured, a bearing carried by the rear end of the sub-frame, and a pin on the crane frame extending into said bearing and forming a pivot and support for the rear end of the crane frame, said last and first named pins being disposed on a common plane and axis.

5. In a structure of the character described, a tractor unit and a crane supporting frame, a pair of axle housings on the tractor unit, a pair of beams extending longitudinally of the tractor unit, one on each side thereof, means rigidly securing the rear ends of said beams to the respective axle housings, other means rigidly securing the front ends of the beams to the front end of the tractor unit, a pair of front wheels forming a rigid support for the front end of the crane frame, a pair of driving wheels forming a rigid support for the rear end of the tractor unit and the beams secured thereto, means carried by the beams forming a pivotal support for the rear end of the crane frame, and a pivotal support formed between the front end of the crane frame and the front end of the tractor unit and the beams secured thereto.

6. In a structure of the character described, a tractor unit and a crane supporting frame, a sub-frame rigidly secured to the tractor unit, a pair of rear driving wheels on the tractor unit forming a rigid two-point support for the rear end of the sub-frame and the tractor unit, a pair of front wheels forming a rigid two-point support for the crane frame, a pin on the front end of the crane frame forming a pivot and support for the front end of the sub-frame and the tractor unit to which the sub-frame is secured, a bearing carried by the rear end of the sub-frame, a pin on the crane frame extending into said bearing and forming a pivot and support for the rear end of the crane frame, said last and first named pins being disposed on a common longitudinal axis, a crane supported by the crane frame, a hoist on the crane frame to operate the crane and a power take-off shaft on the tractor unit whereby power is transmitted to operate the hoist.

7. In a structure of the character described, a tractor unit and a crane supporting frame, a pair of axle housings on the tractor unit, a pair of beams extending longitudinally of the tractor unit, one on each side thereof, means rigidly securing the rear ends of said beams to the respective axle housings, other means rigidly securing the front ends of the beams to the front end of the tractor unit, a pair of front wheels forming a rigid support for the front end of the crane frame, a pair of driving wheels forming a rigid support for the rear end of the tractor unit and the beams secured thereto, an upright bearing plate connecting the rear ends of the beams, a pin on the crane frame extending through said plate and forming a pivot and support for the rear end of the crane frame, and a pivotal support between the front end of the tractor unit and the crane frame.

8. In a structure of the character described, a tractor unit and a crane supporting frame, a pair of axle housings on the tractor unit, a pair of beams extending longitudinally of the tractor unit, one on each side thereof, means rigidly securing the rear ends of said beams to the respective axle housings, other means rigidly securing the front ends of the beams to the front end of the tractor unit, a pair of front wheels forming a rigid support for the front end of the crane frame, a pair of driving wheels forming a rigid support for the rear end of the tractor unit and the beams secured thereto, an upright bearing plate connecting the rear ends of the beams, a pin on the crane frame extending through said plate and forming a pivot and support for the rear end of the crane frame, a pivotal support between the front end of the tractor unit and the crane frame, a crane supported by the crane frame, a hoist on the crane frame to operate the crane, a power take-off shaft on the tractor unit whereby power is transmitted to operate the hoist, and a slot formed in the bearing plate through which the power take-off shaft extends.

FRANK P. LAWLER.